United States Patent [19]
Tanaka

[11] Patent Number: 5,249,007
[45] Date of Patent: Sep. 28, 1993

[54] STROBE APPARATUS

[75] Inventor: Kazuo Tanaka, Neyagawa, Japan

[73] Assignee: West Electric Company Ltd., Osaka, Japan

[21] Appl. No.: 903,505

[22] Filed: Jun. 24, 1992

[30] Foreign Application Priority Data

Jun. 26, 1991 [JP] Japan .................. 3-154263

[51] Int. Cl.⁵ .................. G03B 17/00; H05B 43/00
[52] U.S. Cl. .................. 354/145.1; 315/241 P
[58] Field of Search .................. 354/145.1, 413, 416, 354/417; 315/241 P, 241 R, 241 S

[56] References Cited

U.S. PATENT DOCUMENTS

| | | | |
|---|---|---|---|
| 4,839,686 | 6/1989 | Hosomizu et al. | 354/416 |
| 5,051,768 | 9/1991 | Harrison | 354/415 |
| 5,075,714 | 12/1991 | Hagiuda et al. | 354/416 |
| 5,107,292 | 4/1992 | Tanaka et al. | 354/145.1 |
| 5,111,233 | 5/1992 | Yokonuma et al. | 354/416 |
| 5,159,381 | 10/1992 | Harrison | 354/416 |

Primary Examiner—Michael L. Gellner
Assistant Examiner—Eddie C. Lee
Attorney, Agent, or Firm—Ratner & Prestia

[57] ABSTRACT

The strobe apparatus of the present invention applies upon both the ends of the flash discharging tube the oscillating voltages to be caused in the primary winding of the trigger transformer by the discharging operation of the trigger capacitor, and also, quickly charges the trigger capacitor through the flash discharging tube at the ionized condition time. At the light emitting operation time, the high voltage of charging electric voltage or more of the main capacitor is applied upon both the ends of the flash discharging tube without fail so that the light emission coming off prevention at the high speed repeating light emitting operation can be realized.

6 Claims, 2 Drawing Sheets

STROBE APPARATUS

BACKGROUND OF THE INVENTION

The present invention generally relates to a strobe apparatus with an insulated gate bipolar transistor (hereinafter referred to as I. G. B. T.) for controlling the light emitting operation of the flash discharging tube being connected in series with a flash discharging tube, and more particularly, to a strobe apparatus characterized by a voltage supplying system to the above described flash discharging tube which becomes effective when the light is repeatedly emitted at speed.

An apparatus disclosed in U.S. Pat. No. 4,839,686 is known as a strobe apparatus using such conventional I. G. B. T. as described hereinabove.

The conventional apparatus has such a circuit construction shown in FIG. 3. The conventional apparatus comprises a direct current high-tension power supply 1 which is a known DC-DC converter circuit, a main capacitor 2 to be charged by the power supply 1, a constant voltage circuit 3, which is provided together on the above described power supply 1, for feeding the constant voltage to a light emission controlling circuit 7 to be described later, a known trigger circuit 4 for triggering a flash discharging tube 5, a controlling circuit 6, which is connected with a control means 8 within a camera body, for transferring various signals, generating various output signals such as trigger signals or the like for operating the trigger circuit 4, a light emission controlling circuit 7 for controlling the on . off of the I. G. B. T. connected in series with the flash discharging tube 5, and controlling the light emission of the above described flash discharging tube 5, and a voltage doubler circuit 9 for applying the double voltage of a charging voltage of the main capacitor 2 between the main electrodes of the flash discharging tube 5.

When a switch Sw is turned on in the above described apparatus, the direct current high-tension power supply 1 is operated so as to charge like a shown polarity the main capacity 2, a voltage doubler capacitor 9a by the outputting high tension of the above described direct current high-tension power supply 1. By the on of the switch Sw, a power supply capacitor Ce for functioning as a power supply of the control circuit 6 is charged with a low-tension power supply E, and at the same time, the capacitor 3a of the constant voltage circuit 3 is also charged. The control circuit 6 starts its operation and the light emission controlling circuit 7 is put into a light emission preparing condition.

When the light emission starting signal is inputted to the controlling circuit 6 from the controlling means 8 with each of the above described capacitors being charged, the control circuit 6 operates to output a high level signal from the output terminal Oa for turning on the transistors Qa, Qb of the light emission controlling circuit 7.

When the transistors Qa, Qb are turned on, the I. G. B. T. is turned on by the charging voltage of the capacitor 3a so as to operate the trigger circuit 4. As a result, the flash discharging tube 5 consumes the charging electric charge of the main capacitor 2 so as to emit its light.

When the light emission stopping signal is inputted into a control circuit 6 from the control means 8 on the way to the above described light emission, the controlling circuit 6 operates. The controlling circuit 6 outputs a high level signal from an output terminal Ob so as to turn on the transistors Qc, Qd of the light emission controlling circuit 7. The transistors Qb, I. G. B. T. turned on so far by it are turned off so as to stop the light emission of the flash discharging tube 5.

Such an operation as described hereinabove is a fundamental operation of the conventional apparatus shown in FIG. 3.

A strobe apparatus using such a known I. G. B. T. as described hereinabove cannot have light emission over no more, unlike from the conventional apparatus which stops the light emission with the use of the commutation capacitor. The repeated high-speed light emitting operation, smaller size of the apparatus shape can be realized.

But the above described high speed repeated light emitting operation still has the following problems.

When the period of the high speed repeated light emitting operation becomes a high period of a given high period or more, for example, a period band of several tens of Hz or more, a condition where the next light emitting operation is effected before the sufficient charging operation of the voltage doubler capacitor 9a is effected in the construction as shown in FIG. 3 is considered. The flash discharging tube 5 cannot be effected as the function of the voltage doubler circuit 9 cannot be expected, with a disadvantageous point that a light emission coming off operation is caused.

Concretely, the above described voltage doubler circuit 9a is started in its charging for the first time at a time point when the cathode potential of the flash discharging tube 5 has been put at a low level. In other words, the charging operation is not effected, as clear from the illustrated circuit construction, while the above described cathode potential remains at a high level.

The above described cathode potential, when the flash discharging tube 5 once emits its light, is known to be maintained at a high electric potential during a period from the completion of the ionized condition to the return to the initial condition if the energy supply is stopped. Also, the above described voltage doubler capacitor 9a has a proper charging time constant. When the next light emitting operation has been effected at a time point when the above described time constant is not passed during the above described period or after the above described period has passed, sufficient charging operation is not effected to the above described voltage doubler capacitor 9a. As a result, the operation of the voltage doubler circuit 9 cannot be expected.

In a case of an extremely high period exceeding the above described period band, an operation for the next light emission is effected at a time in such a condition as the light emission can be effected if the light emission discharging tube 5 is not triggered. The light emission discharging tube 5 is emitted with extreme ease. It is known that the light emission coming off operation described hereinabove is not caused.

When the smaller size and the light emitting light-quantity increase are considered to be effected in the flash discharging tube, a method of increasing an internal gas pressure so as to have a higher impedance is known. Such a method is known for having raised the discharging start voltage of the above described flash discharging tube. In the high speed repeated light emitting operation, the radiation characteristics are deteriorated due to the smaller size, the heat storing characteristics are increased due to higher impedance, light emitting start voltage is raised more. Considering the above described situation, the operation of the voltage doubler circuit cannot be expected, thus rendering the light emission of the flash discharging tube disadvantageous further.

SUMMARY OF THE INVENTION

Accordingly, an essential object of the present invention is to provide an improved strobe apparatus which is provided with an I. G. B. T. so as to prevent the light emission coming off operation capable of an positive next light emitting operation at a high speed repeated light emitting operation of a certain period band of several tens of Hz or more.

Another important object of the preset invention is to provide a strobe apparatus which is provided with an I. G. B. T. which can pile up on the main capacitor high voltages to be used in the windings of the trigger transformer at a trigger operation time so as to apply them upon both the ends of the flash discharging tube, and feed the high voltages of a charging voltage or more of the main capacitor without fail between the main electrodes of the flash discharging tube at the light emitting operation time.

Still another object of the present invention is to provide a strobe apparatus which can adopt smaller size, higher impedance of flash discharging tube by the prevention of the light emission coming off operation.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
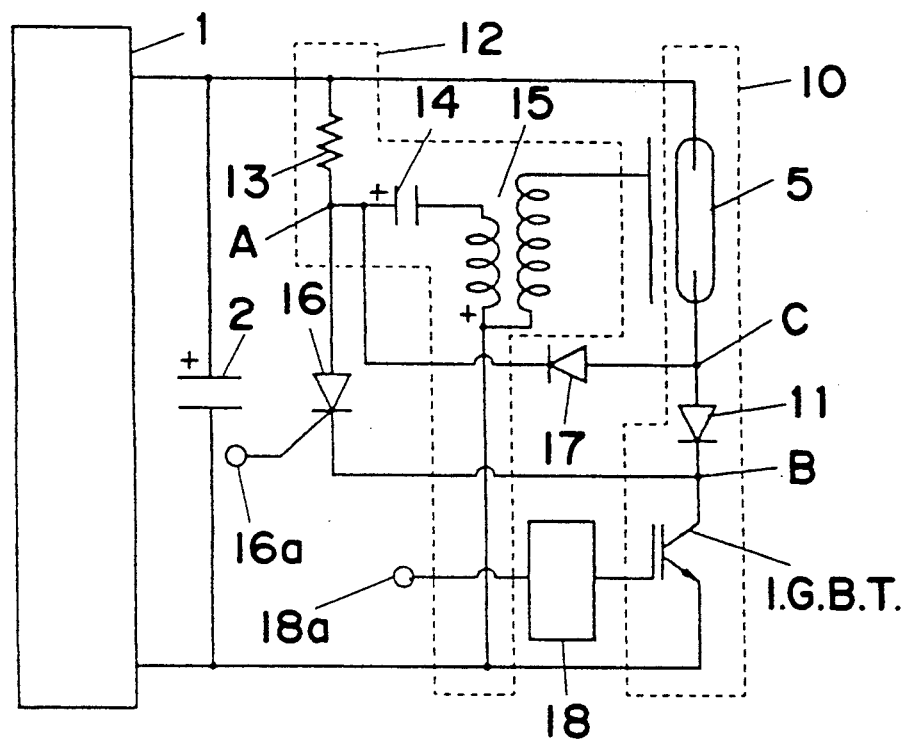
FIG. 1 is an electric circuit diagram showing one embodiment of a strobe apparatus in accordance with the present invention.

Before the description of the present invention proceeds, it is to be noted that like parts are designated by like reference numerals throughout the accompanying drawings.

Figure 3:
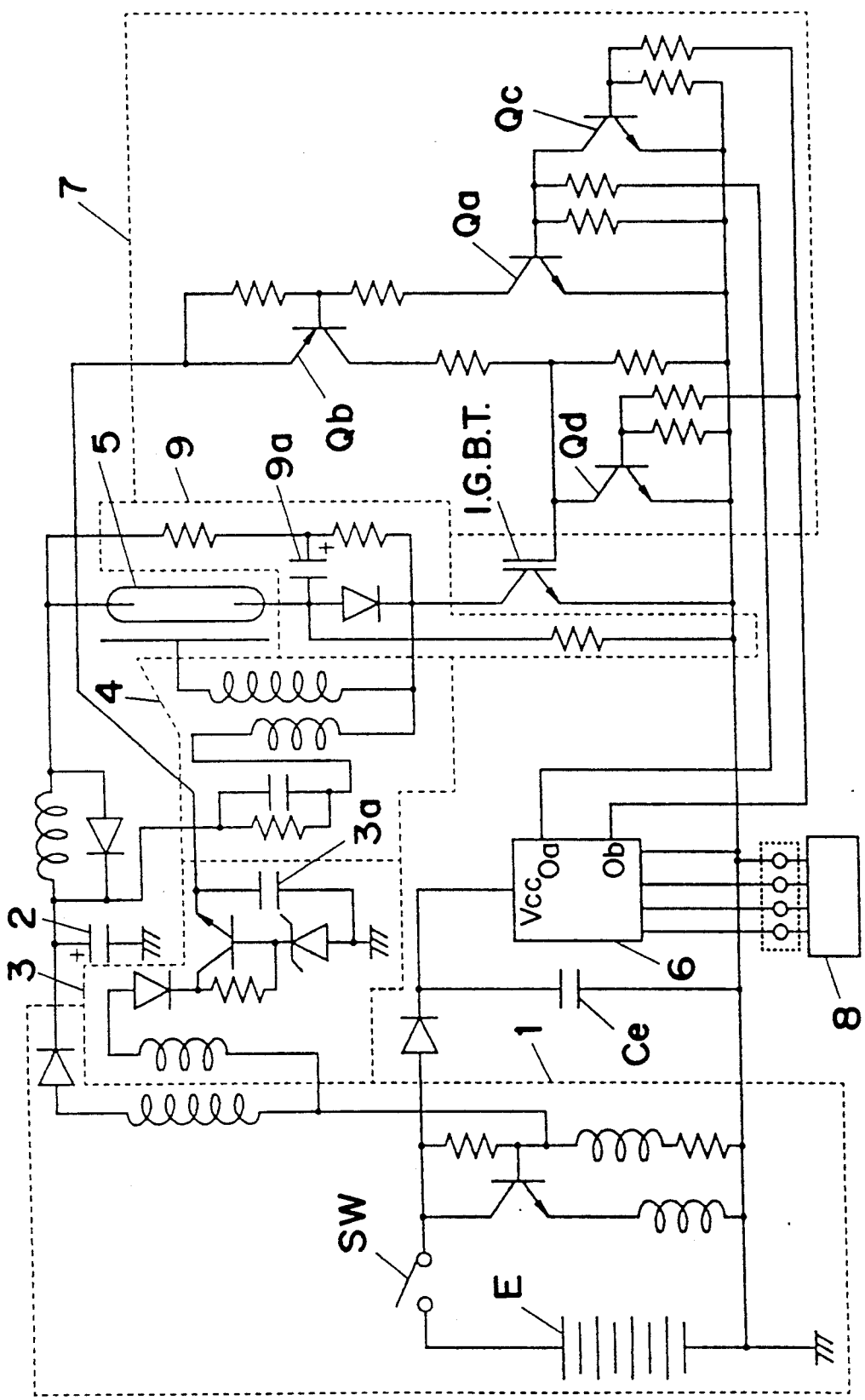
FIG. 3 is an electric circuit diagram showing one embodiment of a strobe apparatus disclosed in U.S. Pat. No. 4,839,688.

FIG. 1 is an electric circuit diagram showing one embodiment of a strobe apparatus in accordance with the present invention. In FIG. 1, elements of the same reference numerals as those of FIG. 3 are the same in function.

A main capacitor 2 is connected with both the ends of a direct current high-tension power supply 1 composed of a known DC-DC converter circuit, a layer-built power supply and so on.

A first series connector 10 connected in series with a flash discharging tube 5, a first diode 11, an I. G. B. T., and a second series connector 12 connected in series with a charging resistor 13, a trigger capacitor 14, a trigger transformer 15 are connected with both the ends of the main capacitor 2.

A SCR 16, which is a trigger switch element, having a control pole 16a to which light emission starting signals are fed is connected between a connection point A between a charging resistor 13 and a trigger capacitor 14 and a connecting point B between a first diode 11 and an I. G. B. T.

A high potential side terminal of the SCR 16 is connected with the high potential side of the trigger capacitor 14. The low potential side terminal is connected with the cathode of the first diode 11.

A second diode 17 is connected in a forward direction between a connecting point C between a first diode 11 and a flash discharging tube 5, and the above described connecting point A.

The gate of the I. G. B. T. is connected with the output terminal of the drive controlling circuit 18 for controlling the conducting, nonconducting operations of the I. G. B. T. For example, a light emission stopping signal is fed to the input terminal 18a of the drive controlling circuit 18.

Such a control system circuit as make the I. G. B. T. turn on in response to the operation of the direct current high-tension power supply 1, and turn off by the feeding operation of the light emission stopping signal, or such a control system circuit as make the I. G. B. T. turn on in response to the light emission starting signal, namely, only at the light emitting operation, and turns off by the feeding operation of the light emission stopping signal is considered the above described drive controlling circuit 18.

The operation in one embodiment of a strobe apparatus in accordance with the present invention shown in FIG. 1 will be described hereinafter.

Assume that the circuit of the former from two circuits described before is adopted as a drive controlling circuit 18.

When the operation of the direct current high-tension power supply 1 starts its operation by the putting of a proper power supply switch, not shown, to work, a charging operation is effected into the shown poles of the main capacitor 2 and the trigger capacitor 14 by the direct current high-tension to be outputted between the output terminals. At the same time, the drive controlling circuit 18 is input into an operating condition in response to the operation start of the above described direct current high-tension power supply 1.

The drive controlling circuit 18 is put into an operating condition so as to output the on voltage of the I. G. B. T. from the output terminal for putting the I. G. B. T. into a conduction preparing condition.

When the light emission starting signal is fed to the input terminal 16a of the SCR 16 for composing the trigger switch means at a proper time point in a condition where each of the above described capacitors has been charged, the SCR 16 turns on as the I. G. B. T. is put into a conduction preparing condition by the operation of the drive controlling circuit 18.

When the SCR 16 is turned on, the charging electric charge of the trigger capacitor 14 is released through a primary windings of the SCR 16, the I. G. B. T., the trigger transformer 15 so as to excite the flash discharging tube 5 by the high tension to be caused in the secondary winding. At this time, an oscillating voltage including the voltage of the polarity (shown) in the above described primary winding is caused.

Both the end voltages of the flash discharging tube 5 is boosted so far as voltage higher than the charging voltage of the main capacitor 2 by the voltage of the polarity (shown) which is one portion of the oscillating voltage caused in the above described primary winding.

The above described flash discharging tube 5 starts its light starting operation with extreme ease. The charging electric charge of the main capacitor 2 is consumed from the on time point of the above described SCR 16 so as to emit the light. The application into the flash discharging tube 5 of the voltage reverse in polarity to the polarity (shown) of the above described oscillating voltage is prevented by a secondary diode 17 from being effected.

When the light emission stopping signal is fed to the input terminal 18a of the drive controlling circuit 18 at a proper time point when the flash discharging tube 5 is emitting its light, the I. G. B. T. is made off.

When the I. G. B. T. is turned off, the discharging loop of the main capacitor 2 and the trigger capacitor 14 are cut off. The flash discharging tube 5 returns to an initial condition through the ionized condition, and at the same time, the SCR 16 is also turned off. The off period of the I. G. B. T. is controlled by a supply period itself of a light emission stopping signal to be fed to the above described drive controlling circuit 18, or by the operation of the drive controlling circuit 18 itself, and by the consideration of the light emitting condition of the flash discharging tube 5. In the present embodiment, the following description will be effected with the supply period itself of the light emission stopping signal being made an off period of the I. G. B. T.

The present invention has a second diode 17 for connecting the cathode of the flash discharging tube 5 with the high potential side of the trigger capacitor 14. When the flash discharging tube 5 is ionized by the tuning off of the above described I. G. B. T. and the cathode potential becomes high, the current comes to flow with a loop of the main capacitor 2, the flash discharging tube 5, the second diode 17, the trigger capacitor 14, the trigger transformer 15. Namely, at the ionization condition of the flash discharging tube 5, the charging of the trigger capacitor 14 is effected through the above described second diode 17.

The above described charging loop has no high impedance elements. The charging time constant becomes extremely small. Needless to say, the charging operation of the above described trigger capacitor 14 is effected in a moment.

When the supply of the light emission stopping signal to the drive controlling circuit 18 is stopped so as to emit the next light in a condition where the I. G. B. T. is off, and also, the light emission starting signal is fed to the control pole 16a of the SCR 16, so that the SCR 16 is turned on.

When the SCR 16 is turned on, the flash discharging tube 5 is excited by discharge through the trigger transformer 15 of the trigger capacitor 14 as in the former case. Also, the oscillating voltage including the voltage of polarity (shown) is caused in the primary winding of the trigger transformer 15.

One portion of the above described oscillating voltage, namely, the voltage of the illustrated polarity is applied upon both the ends of the flash discharging tube 5 through the main capacitor 2, the second diode 17, the trigger capacitor 14. Accordingly, both the end voltages of the flash discharging tube 5 are boosted as far as a voltage higher than the charging voltage of the main capacitor 2. The flash discharging tube 5 starts its light emitting operation with extreme ease so as to consume the charging electric charge of the main capacitor 2 for emitting the light.

The above described trigger capacitor 14 is charged momentarily through a second diode 17 at the ionized condition time of the above described flash discharging tube 5. The discharging operation in a case of a light emitting operation of a high period becomes also extremely stable and desired.

A generating condition of the above described oscillating voltage and a condition applied upon the flash discharging tube 5 are also extremely stable, so that the light emission coming off operation of the flash discharging tube 5 can be prevented.

After a proper high speed repeated light emitting operation, the light emission stopping signals are fed for a period, or more, for considering the returning time to the initial condition through the ionized condition of the flash discharging tube 5. The above described flash discharging tube 5 is returned completely to an initial condition, and further, the I. G. B. T. are put again into a conduction preparing condition. The strobe apparatus in the present embodiment is returned to a condition before the high speed repeated light emitting operation is started.

Figure 2:
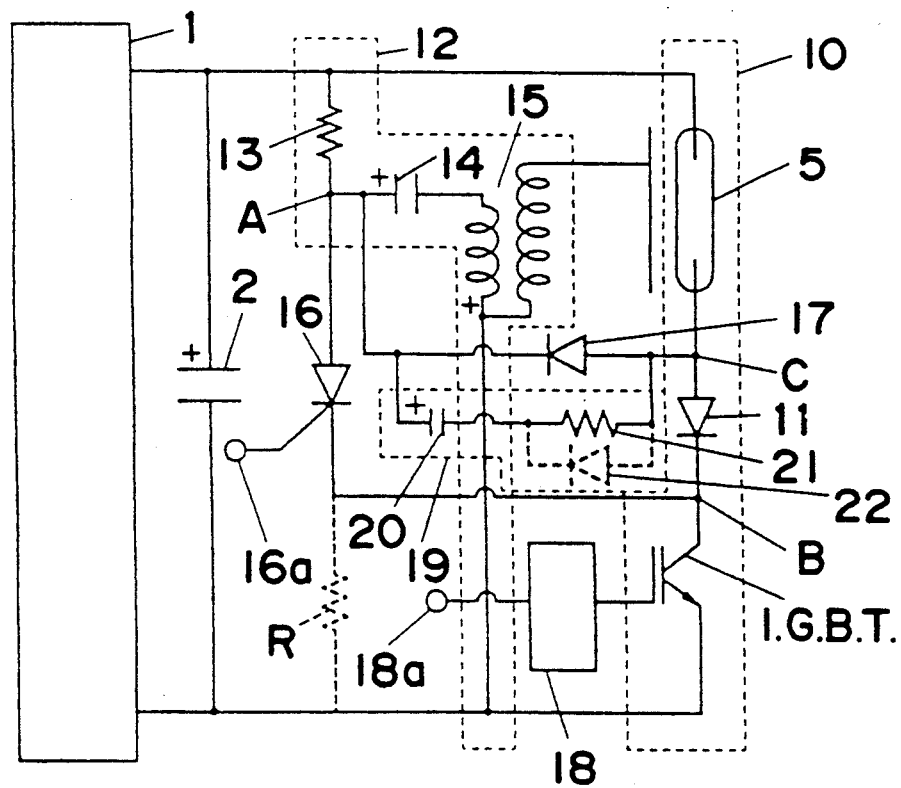
FIG. 2 is an electric circuit diagram showing another embodiment of a strobe in accordance with the present invention.

FIG. 2 is an electric circuit diagram showing the other embodiment of a strobe apparatus in accordance with the present invention. In FIG. 2, the components of the same references as those in FIG. 1 show the same elements.

As clear from FIG. 2, the embodiment shows that a voltage doubler means 19 with a voltage doubler capacitor 20 being connected in series with a resistor 21 is connected to both the ends of the second diode 17 in an embodiment shown in FIG. 1.

Although the charging operation of the above described voltage doubler capacitor 20 is necessary to be effected before the light emitting operation of the flash discharging tube 5, such charging operation is effected through the above described I. G. B. T, thus resulting in no problems when a circuit of such a control system which makes, for example, the I. G. B. T. turn on in response to the operation of the direct current high-tension power supply 1, makes the I. G. B. T. turn off by the feeding operation of the light emission stopping signal is adopted as the driving controlling circuit 18 as described hereinabove.

When a circuit of the control system which makes the I. G. B. T. turn on only at the light emitting operation in response to the light emission starting signal makes it turn off by the feeding operation of the light emission stopping signal is adopted as the drive controlling circuit 18, it is necessary to provide a resistor R shown in broken lines in, for example, FIG. 2 in parallel to the I. G. B. T. so as to form the charging loop of the above described voltage doubler capacitor 20.

A resistor R to be connected in parallel with the I. G. B. T. may be provided when the circuit of a system for responding to a direct current high-tension power supply 1 as a drive controlling circuit 18. In such a case, the resistor R comes to function as an element for charging electric charge discharging use of the floating capacity component of the I. G. B. T., instead of an element for charging loop forming use of the voltage doubler capacitor 20. Although not shown, a resistor R connected in parallel with the I. G. B. T. may be provided with a similar object as in the embodiment shown in FIG. 1.

Although the operation of the embodiment shown in FIG. 2 is described hereinafter, the operation by the other circuit construction becomes equal to the operation of FIG. 1 basically with the operation of the voltage doubler means 19 being added to the operation of the embodiment of FIG. 1 previously described. Assume that a circuit of a system for responding to the above described direct current high-tension power supply 1 is adopted as a drive controlling circuit 18.

When the direct current high-tension power supply 1 starts its operation, the charging operation is effected to a shown polarity of the main capacitor 2, the trigger capacitor 14 as in the previous embodiment, and also, the drive controlling circuit 18 starts its operation so as to put the I. G. B. T. into an on condition.

When the I. G. B. T. is put into the on condition, the present embodiment becomes different from the foregoing embodiment, and the charging operation is effected to the shown polarity of the voltage doubler capacitor 20 of the voltage doubler means 19.

When the light emission starting signal is fed to the control pole 16a of the SCR 16 in a condition where the charging operation of each of the above described capacitors 2, 14, 20 is effected, the SCR 16 is turned on so as to discharge the charging electric charge of the trigger capacitor 14 through a trigger transformer 15 or the like by the turning on of the SCR 16. At the same time, the charging voltage of the voltage doubler capacitor 20 is to be applied upon both the ends of the flash discharging tube 5 through the above described SCR 16, the I. G. B. T., the main capacitor 2.

The flash discharging tube 5 is excited by the high voltage to be caused in the secondary windings of the trigger transformer 15 through the above described discharging operation. The oscillating voltage including the voltage of the shown polarity to be caused in the primary winding of the above described trigger transformer 15 is piled up on the charging voltage of the main capacitor 2, is applied upon both the ends.

Accordingly, both the end voltages of the flash discharging tube 5 is boosted to a voltage approximately twice as many as the charging voltage of the main capacitor 2 by the oscillating voltage to be induced in the discharging voltage of the above described voltage doubler capacitor 20 or the above described primary winding. Thus, the flash discharging tube 5 starts the light emitting operation with extremely ease so as to consume the charging electric charge of the main capacitor 2 for emitting the light.

In the applying condition onto both the ends of the flash discharging tube 5 of the oscillating voltage to be caused in the above described primary winding in the present embodiment, the voltage doubler means 19 composed of the voltage doubler capacitor 20 and so on is provided at both the ends of the second diode 17 so that the condition becomes an applying condition where all the oscillating voltages are applied. The application of the voltage reverse in polarity to the illustrated polarity as shown in the foregoing embodiment is not prevented.

The electrical energies having the oscillating voltage caused in the above described primary winding are smaller, needless to say, as compared with those having the main capacitor 2 or the voltage doubler capacitor 20 so that the above described applied condition does not give ill influences to a function of boosting both the end voltages of the above described flash discharging tube 5.

When a light emission stopping signal is fed to the input terminal 18a of the drive controlling circuit 18 on the way to the light emission of the flash discharging tube 5 so as to turn off the I. G. B. T., the discharging loop of the above described main capacitor 2 and the trigger capacitor 14 is cut off. The flash light discharging tube 5 tries to return to the initial condition through the ionized condition so as to turn off the SCR 16.

When the flash discharging tube 5 becomes ionized, the current flows through the flash discharging tube 5, the second diode 17, the trigger capacitor 14 and the trigger transformer 15. As a result, the charging operation of the above described trigger capacitor 14 is momentarily effected.

The voltage doubler capacitor 20 is not charged, because the charging loop is not formed during the I. G. B. T. off period. In the case of the present embodiment, the above described charging operation is effected from a time point when the feeding operation of the light emission stopping signals has stopped, and the I. G. B. T. has returned to an on condition. When a resistor R shown in broken line in FIG. 2 is provided, the charging operation is adapted to be effected through the resistor R. The proper charging time constant is provided as in the conventional apparatus described at the beginning.

When, in the state of the I. G. B. T. being off, the supply of the light emission stopping signal to the drive controlling circuit 18 is stopped and the light emission starting signal is fed to the control pole 16a of the SCR 16, so as to effect the next light emission, the I. G. B. T. is returned to the on condition so as to turn on the SCR 16.

When the SCR16 is turned on, the flash discharging tube 5 is excited by the discharging operation through the trigger transformer 15 of the trigger capacitor 14 as in the foregoing embodiment, and also, the oscillating voltage including the voltage of the illustrated polarity in the primary winding of the trigger transformer 15.

At the same time, although the voltage doubler capacitor 20 is connected in series with the main capacitor 2 in the present embodiment, the operation is a light emission starting operation with the I. G. B. T. being off, and the charging operation of the voltage doubler capacitor 20 is not effected, which is different from the foregoing case. In such a case, the boosting operation of the both the ends of the flash discharging tube 5 by the above described voltage doubler capacitor 20 is not effected.

Even in a case having the above described resistor R, it is considered that sufficient voltage value is not obtained, and the satisfactory boosting function cannot be expected as described at the beginning although it depends upon the relationship between the charging time constant and the period from the light emission stopping operation to the above described light emission starting operation.

When the next light emission starting operation, a so-called high speed repeating light emission is effected at a time point of the I. G. B. T. off as in the conventional apparatus described at the beginning, the operation, effect are not obtained by the voltage doubler means 19 in a second, and its subsequent light emitting operation.

In the present invention, as described even in the foregoing embodiment, the oscillating voltage to be caused in the primary winding of the trigger transformer 15 through the discharging operation of the trigger capacitor 14 is piled up upon the charging voltage of the main capacitor 2, is applied upon both the ends of the flash discharging tube 5.

Both the end voltages of the flash discharging tube 5 are boosted as far as a voltage higher than the charging voltage value of the main capacitor 2, independently of the condition of the voltage doubler capacitor 20, namely, an operating condition of the voltage doubler means 19. The flash discharging tube 5 starts its light emitting operation with ease, consumes the charging electric charge of the main capacitor 2 for emitting the light.

The charging operation of the above described trigger capacitor 14 is momentarily effected through a flash discharging tube 5, a secondary diode 17 and so on at the ionized condition time as in the foregoing embodiment. Even when a high period of light emitting operation is effected, the discharging operation for exciting the above described flash discharging tube 5 and boosting both the end voltages become extremely stable and desired in operation. As a result, the light emission coming off operation of the flash light emitting tube 5 can be prevented even in the embodiment shown in FIG. 2.

As in the foregoing embodiment, after the proper high speed repeating light emitting operation, the light emission stopping signal is fed to the input terminal 18a of the drive controlling circuit 18 for a period, or more, considering a returning time to the initial condition of the flash discharging tube 5.

The strobe apparatus in the present embodiment completely returns the above described flash discharging tube 5 into the initial condition, further turns on the I. G. B. T. on again, and returns to a condition before the high speed repeating light emitting operation starts.

The embodiment shown in the above described FIG. 2 is different from the embodiment shown in FIG. 1 in that voltage doubler means 19 composed of the voltage doubler capacitor 20 and so on is provided. Electrical energies having the above described voltage doubler capacitor 20 are larger than those having the oscillating voltage to be caused by the discharging operation of the trigger capacitor 14. In the embodiment shown in FIG. 2, a flash discharging tube which is harder to emit the light can be adopted, as the flash discharging tube 5, instead of a flash discharging tube to be adopted in the embodiment shown in FIG. 1.

The flash light discharging tube is extremely easier to emit the light after it has once been emitted as compared with before the light emission. Reversibly speaking, it is said that a first light emitting operation is extremely hard to emit. In the embodiment shown in FIG. 2, the voltage doubler operation can be obtained by large energies at a first time by the voltage doubler means 19. In the embodiment shown in FIG. 2, the operation, effect of the above described voltage doubler means 19 cannot be expected with respect to a second light emitting operation and its subsequent at the high speed repeating light emitting time as described hereinabove, and such a point is the same in the conditions as described in the embodiment as shown in FIG. 1, but a flash discharging tube which is harder to emit can be adopted.

In the operational description of the embodiment shown in FIG. 2, when the returning to the on condition of the I. G. B. T. synchronized with the supply of a second light emission starting signal and its subsequent is effected before the supply of the light emission starting signal, a current flows to the voltage doubler means 19 from the trigger capacitor 14 charged at the off operation time of the I. G. B. T. at the above described on condition returning time, so that the charging operation of the voltage doubler capacitor 20 is effected.

The charging operation is to divide the energies charged to the trigger capacitor 14. When the next light emission starting operation is effected in the above described condition, the apparatus effects its operation at an insufficient charging condition even in the trigger capacitor 14, the voltage doubler capacitor 20. The apparatus cannot effect both the exciting operation of the flash discharging tube 5 and the boosting operation of both the end voltages of the flash discharging tube 5 so that the light emission coming off operation may be caused by the characteristics of the adopted flash discharging tube.

In order to prevent the above described fear, the charging time constant of the charging loop of the voltage doubler capacitor 20 by the above described trigger capacitor 14 has only to set large by the adoption of the resistance of the high resistance value as, for example, a resistance 21. Namely, the charging operation of the voltage doubler capacitor 20 by the above described trigger capacitor 14 has only to be not effected within the short time.

If the resistance value of the resistance 21 is made higher as described hereinabove to make the charging time constant of the voltage doubler capacitor 20. the discharging operation of the charging electric charge is influenced this time. When the resistance 21 of, for example, high resistance value exists within the discharging loop, sufficient energies cannot be fed to both the ends of the flash discharging tube 5, with an inconvenience that an original function of the voltage doubler capacitor 20 of boosting both the end voltages of the flash discharging tube 5 cannot be effected.

When the charging time constant of the voltage doubler capacitor 20 is made larger as described hereinabove, it becomes extremely effective for the anode to provide a diode 22 to be connected with an anode of the first diode 11 at both the ends of the resistance 21 of the voltage doubler means 19 as shown with broken lines in FIG. 2.

The above described diode 22 is provided with the charging time constant of the voltage doubler capacitor 20 remaining large. The discharge loop of the charging electric charge is formed through the above described diode 22 without the resistance 21 of the high resistance value. As a result, the inflow of the current to the voltage doubler capacitor 20 from the trigger capacitor 14 is restricted and also, such inconvenient occurrence as described hereinabove can be prevented.

As described hereinabove, the strobe apparatus of the present invention charges the trigger capacitor through the flash discharging tube of the ionized condition at the same time with the flash discharging tube becoming ionized at the off time of the I. G. B. T. The oscillating voltage to be caused in the primary winding of the above described trigger transformer accompanied by the discharging operation through the trigger transformer of the above described trigger capacitor is piled up on the charging voltage of the main capacitor so as to apply upon both the ends of the flash discharging tube. At the light emitting operation, the exciting operation of the flash discharging tube and the boosting operation of both the end potential of the flash discharging tube can be stably effected in spite of the period.

As a result, the high speed repeating light emitting operation of several tens of Hz or more can be realized without the coming off operation of the light emission. In other words, the flash discharging tube can positively emit light, following the on . off operation of the high period of the I. G. B. T.

As the high voltage of the charging voltage or more of the main capacitor can be applied upon both the ends of the flash discharging tube, the light emission can be positively and stably effected if the light emission starting voltage of the flash discharging tube is made high.

As a result, smaller size of the flash discharging tube, smaller size of the apparatus shape by high impedance operation, and increase in the light emission light quantity can be realized.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A strobe apparatus comprising:
a direct current high-tension power supply,
a main capacitor, connected with both the ends of the direct current high-tension power supply to be charged by the supplying operation of the direct current high tension power supply,
a first series current circuit comprising a flash discharging tube, a first diode, and an insulated gate bipolar transistor having a control pole, the first series circuit connected in parallel with the main capacitor,
a second series circuit comprising a trigger capacitor and a trigger transformer, the second series circuit connected in parallel with the main capacitor,
a trigger switch having a control pole to which a light emission starting signal is fed, connected between the trigger capacitor and a connecting point between the first diode and the insulated gate bipolar transistor,
a second diode of which an anode is connected with a connecting point between the flash discharging tube and the first diode, and a cathode is connected with a high electric potential side of the trigger capacitor, whereby said second diode completes a charging loop having no high impedance elements, and
a drive control circuit having an output terminal to be connected with the control pole of the insulated gate bipolar transistor so as to control the conducting, nonconducting operation of the insulated gate bipolar transistor.

2. The strobe apparatus of claim 1 wherein a high electric potential side terminal of the trigger switch is connected to a high electric potential side of the trigger capacitor, and a low electric potential side terminal of the trigger switch is connected to a point between the first diode and the insulated gate bipolar transistor.

3. The strobe apparatus of claim 2 wherein a resistor is connected in series with the trigger capacitor and the trigger transformer.

4. A strobe apparatus comprising; a direct current high-potential power supply,
a main capacitor connected with both the ends of the direct current high-tension power supply to be charged by the supplying operation of the direct current high-tension power supply,
a first series current connector connected in series with a flash discharging tube, a first diode, and an insulated gate bipolar transistor having a control pole, to be connected with both the ends of the main capacitor, a second series connector connected in series with a charging resistor, a trigger capacitor and a trigger transformer to be connected with both the ends of the main capacitor,
a trigger switch element having a control pole to which a light emission starting signal is fed, a high electric potential side terminal to be connected with the high electric potential side of the trigger capacitor, a low electric potential side terminal to be connected with a connecting point between the first diode and the insulated gate bipolar transistor,
a second diode connected with a connecting point between the flash discharging tube and the first diode, a cathode to be connected with high electric potential side of the trigger capacitor,
a voltage doubler means connected in series with a voltage doubler capacitor, a resistor to be connected with both the ends of the second diode,
a drive controlling circuit having an output terminal to be connected with the control pole of the insulated gate bipolar transistor so as to control the conducting, nonconducting operation of the insulated gate bipolar transistor.

5. The strobe apparatus as defined in claim 4, further comprising a voltage doubler means provided with a diode with an anode being connected with an anode of the first diode at both the ends of the resistor.

6. The strobe apparatus as defined in claim 4, further comprising a resistor is connected with both the ends of the insulated gate bipolar transistor.

* * * * *